United States Patent
Miyazaki et al.

(10) Patent No.: US 11,168,895 B2
(45) Date of Patent: Nov. 9, 2021

(54) HEATING AND HOT-WATER SUPPLY APPARATUS

(71) Applicant: Rinnai Corporation, Aichi (JP)

(72) Inventors: Yuya Miyazaki, Aichi (JP); Shigeki Shimada, Aichi (JP); Yoshio Goto, Aichi (JP)

(73) Assignee: Rinnai Corporation, Aichi (JP)

(*) Notice: Subject to any disclaimer, the term of this patent is extended or adjusted under 35 U.S.C. 154(b) by 0 days.

(21) Appl. No.: 16/729,564

(22) Filed: Dec. 30, 2019

(65) Prior Publication Data
US 2020/0309383 A1    Oct. 1, 2020

(30) Foreign Application Priority Data

Mar. 26, 2019   (JP) .............................. JP2019-059519

(51) Int. Cl.
| | |
|---|---|
| *F24D 3/08* | (2006.01) |
| *F24H 1/52* | (2006.01) |
| *F24D 17/02* | (2006.01) |
| *F24D 19/10* | (2006.01) |
| *F24D 3/18* | (2006.01) |

(52) U.S. Cl.
CPC ............... *F24D 3/08* (2013.01); *F24D 17/02* (2013.01); *F24D 3/18* (2013.01); *F24D 19/1072* (2013.01); *F24D 2200/12* (2013.01); *F24D 2220/042* (2013.01); *F24H 1/52* (2013.01)

(58) Field of Classification Search
CPC .................................................. F24D 19/1066
See application file for complete search history.

(56) References Cited

U.S. PATENT DOCUMENTS

| | | | | |
|---|---|---|---|---|
| 2007/0205292 A1* | 9/2007 | Kwak | ..................... | F23N 1/082 |
| | | | | 236/21 B |
| 2009/0287355 A1* | 11/2009 | Milder | ................ | F24D 19/1051 |
| | | | | 700/277 |
| 2012/0091214 A1* | 4/2012 | Rixen | ..................... | F24D 12/02 |
| | | | | 237/5 |
| 2015/0122475 A1* | 5/2015 | Baasch Sorensen | ..... | F24D 3/12 |
| | | | | 165/287 |

(Continued)

FOREIGN PATENT DOCUMENTS

JP    2018-185082 A    11/2018

*Primary Examiner* — Avinash A Savani
*Assistant Examiner* — Deepak A Deean
(74) *Attorney, Agent, or Firm* — Nakanishi IP Associates, LLC

(57) ABSTRACT

A heating and hot-water supply apparatus performs a heating operation by heating a heating medium with a heater and circulating the heating medium through a heating terminal, a hot-water supply operation by circulating the common heating medium through a hot-water supply heat exchanger, heating service water through heat exchange with the heating medium, and supplying hot water, and a simultaneous operation of the heating operation and the hot-water supply operation, and controls a distribution ratio of the heating medium between the heating terminal and the hot-water supply heat exchanger. The apparatus determines whether the heating terminal proceeding in the heating operation is a suspendible terminal to suspend the heating operation or an unsuspendible terminal not to suspend the heating operation in response to a request for the hot-water supply operation.

4 Claims, 6 Drawing Sheets

(56) References Cited

U.S. PATENT DOCUMENTS

| | | | | |
|---|---|---|---|---|
| 2018/0051894 A1* | 2/2018 | Yoshida | ............... | F24D 17/02 |
| 2018/0120824 A1* | 5/2018 | Shimada | ............. | G05B 23/027 |
| 2018/0347856 A1* | 12/2018 | Maeda | ............... | F24D 19/1066 |
| 2018/0372343 A1* | 12/2018 | Kusachi | ................. | F24D 3/08 |
| 2019/0003742 A1* | 1/2019 | Ikari | ................... | G05F 1/625 |
| 2019/0032959 A1* | 1/2019 | Tsuda | ................. | F24H 9/144 |
| 2019/0032960 A1* | 1/2019 | Tsuda | ................. | F24H 9/1836 |
| 2020/0309382 A1* | 10/2020 | Fukaya | ................. | F24H 1/52 |

\* cited by examiner

HEATING AND HOT-WATER SUPPLY APPARATUS

BACKGROUND OF INVENTION

Field of the Invention

The present invention relates to a heating and hot-water supply apparatus that performs, using a common heating medium, a heating operation by circulating the heating medium through a heating terminal, a hot-water supply operation of heating service water through heat exchange with the heating medium circulated through a hot-water supply heat exchanger and supplying hot water, and a simultaneous operation of simultaneously performing the heating operation and the hot-water supply operation.

Background Art

Heating and hot-water supply apparatuses have been developed to perform a heating operation of heating a heating medium with a burner or another heating unit (heater) and circulating the heating medium through a heating terminal, and a hot-water supply operation of circulating the common heating medium through a hot-water supply heat exchanger to heat service water through heat exchange with the heating medium and supplying hot water. Such a heating and hot-water supply apparatus includes a distribution unit such as a three-way valve for changing the distribution ratio of the heated heating medium between the heating terminal and the hot-water supply heat exchanger. The apparatus controls the distribution unit to switch between the heating operation and the hot-water supply operation and also to perform a simultaneous operation of simultaneously performing the heating operation and the hot-water supply operation.

However, during the simultaneous operation, the heating operation and the hot-water supply operation may compete for heat generated by the heater. When the heater generates an insufficient amount of heat, the hot-water supply operation is usually prioritized over the heating operation. For example, Patent Literature 1 describes a heating and hot-water supply apparatus that determines whether the simultaneous operation can be performed based on the amount of heat to be used for hot-water supply (the heat amount for hot-water supply). When the heat amount for hot-water supply is equal to or greater than a predetermined reference heat amount, the apparatus does not allow the simultaneous operation and focuses on the hot-water supply operation.

CITATION LIST

Patent Literature

Patent Literature 1: Japanese Unexamined Patent Application Publication No. 2018-185082

However, such a heating and hot-water supply apparatus that determines whether the simultaneous operation can be performed based on the heat amount for hot-water supply may receive a request for the hot-water supply operation during the heating operation. In this case, the apparatus does not allow the simultaneous operation and focuses on the hot-water supply operation. This can degrade the user comfort for heating. For example, when the heating medium stops circulating through a heating terminal that uses a heating system with blowing air, such as a fan convector, no warm air fed from the heating terminal may cause the user to feel cold, thus degrading the comfort.

SUMMARY OF INVENTION

One or more aspects of the present invention are directed to a technique for responding to a request for the hot-water supply operation during the heating operation of a heating and hot-water supply apparatus without degrading the user comfort for heating.

A heating and hot-water supply apparatus according to one or more aspects of the present invention has the structure described below. A heating and hot-water supply apparatus for performing, using a common heating medium, a heating operation by circulating the heating medium through a heating terminal, a hot-water supply operation of heating service water through heat exchange with the heating medium circulated through a hot-water supply heat exchanger and supplying hot water, and a simultaneous operation of simultaneously performing the heating operation and the hot-water supply operation, the apparatus includes a heater that heats the heating medium, a distribution unit that changes a distribution ratio of the heating medium distributed between the heating terminal and the hot-water supply heat exchanger, a switching controller that controls the distribution unit to switch between the heating operation, the hot-water supply operation, and the simultaneous operation, a heating controller that controls an amount of heat generated by the heater to adjust a temperature of the heating medium, and a determination unit that determines whether the heating terminal proceeding in the heating operation is a suspendible terminal to suspend the heating operation in response to a request for the hot-water supply operation or an unsuspendible terminal not to suspend the heating operation in response to a request for the hot-water supply operation. In response to a request for the hot-water supply operation during the heating operation, the switching controller does not allow the simultaneous operation but switches to the hot-water supply operation when the heating terminal proceeding in the heating operation is the suspendible terminal, and switches to the simultaneous operation when the heating terminal proceeding in the heating operation is the unsuspendible terminal.

The heating and hot-water supply apparatus according to this aspect of the invention may receive a request for the hot-water supply operation during the heating operation. When the heating medium circulates only through a suspendible heating terminal, the apparatus does not allow the simultaneous operation and switches to the hot-water supply operation, thus performing the hot-water supply operation with higher priority. The heat generated by the heater is solely used for the hot-water supply operation to maximize the hot-water supply capacity. In contrast, when the heating medium circulates through any unsuspendible terminal, the apparatus can switch to the simultaneous operation and continue the heating medium circulation through the unsuspendible terminal, thus responding to the request for the hot-water supply operation without degrading the user comfort for heating.

The heating and hot-water supply apparatus according to the above aspect of the present invention may determine the heating terminal as the suspendible terminal when the heating terminal is a radiator (radiant heating terminal) for radiating heat without blowing air, and determine the heating terminal as the unsuspendible terminal when the heating terminal is a convector (convectional heating terminal) for radiating heat with blowing air.

The heating medium circulating through a radiator (radiant heating terminal) is surrounded by nearby stored heat, and thus does not cool easily or does not greatly affect the room temperature although the circulation is suspended temporarily. Thus, the heating operation can be suspended, and the hot-water supply operation can be performed with higher priority. In contrast, the heating medium circulating through a convector (convectional heating terminal) may cause no warm air fed from the heating terminal when the heating medium circulation is suspended. Instead of suspending the heating operation, the apparatus can switch to the simultaneous operation to prevent the user comfort for heating from being degraded (the user from feeling cold).

The heating and hot-water supply apparatus according to the above aspect of the present invention may determine the heating terminal as the suspendible terminal when a temperature of the heating medium required for the heating operation (requested heating temperature) is lower than a predetermined temperature, and determine the heating terminal as the unsuspendible terminal when the requested heating temperature is equal to or higher than the predetermined temperature.

A convector (convectional heating terminal) typically has a requested heating temperature higher than a radiator (radiant heating terminal). Thus, for a high requested heating temperature equal to or higher than a predetermined temperature, the heating terminal can be determined to be a convector. For a low requested heating temperature lower than the predetermined temperature, the heating terminal can be determined to be a radiator (radiant heating terminal). Determining the heating system of the heating terminal based on the requested heating temperature in this manner enables the determination as to whether the simultaneous operation can be performed without communication about the heating system from the heating terminal or without information about the heating system input by the installer for the heating and hot-water supply apparatus.

The heating and hot-water supply apparatus according to the above aspect of the present invention may also have the structure described below. The heating and hot-water supply apparatus may be provided with a water supply channel that feeds service water to the hot-water supply heat exchanger, a hot-water channel that allows the hot water heated with the hot-water supply heat exchanger to flow, and a bypass channel that connects the water supply channel and the hot-water channel. The bypass channel allows a part of the service water in the water supply channel to bypass the hot-water supply heat exchanger and flow into the hot-water channel. The heating and hot-water supply apparatus may also adjust a ratio of the service water passing through the bypass channel with an adjuster. When a temperature of the heating medium required for the heating operation (requested heating temperature) is higher than a temperature of the heating medium required for the hot-water supply operation (requested hot-water supply temperature), in response to switching to the simultaneous operation, the heating and hot-water supply apparatus may set a target temperature of the heating medium in the simultaneous operation at the requested heating temperature.

In this aspect, the heating medium heated to the requested heating temperature is fed to the heating terminal, and prevents a decrease (or insufficiency) in the heating capacity during the simultaneous operation. Additionally, the hot-water supply operation during the simultaneous operation allows the adjuster to adjust the mixing ratio of the hot water heated with the hot-water supply heat exchanger and the service water passing through the bypass channel. Although the hot-water supply heat exchanger is supplied with a heating medium with a temperature higher than the requested hot-water supply temperature, the mixing ratio can be adjusted to supply hot water at the temperature intended by the user.

DETAILED DESCRIPTION

Figure 1:
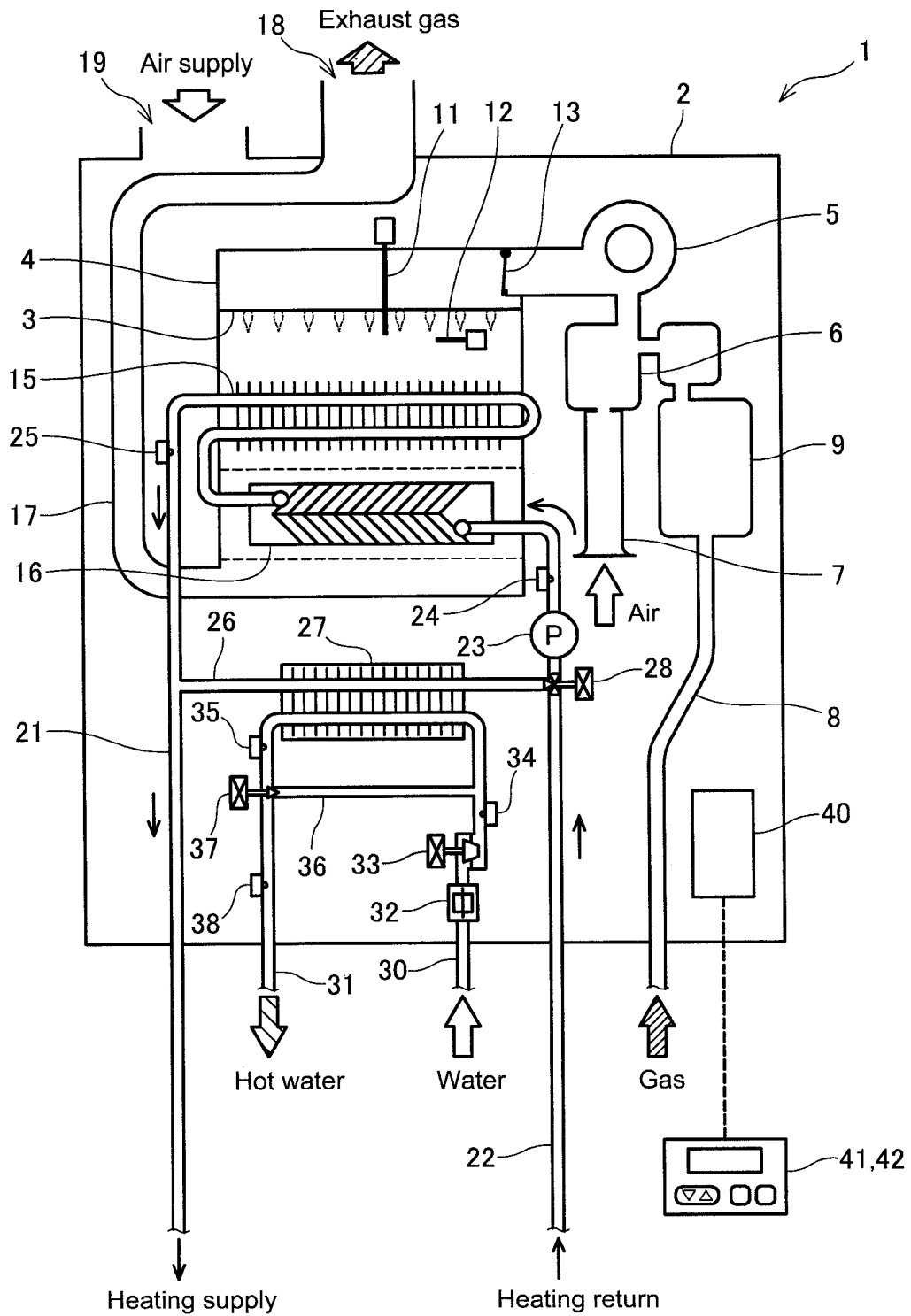
FIG. 1 is a schematic view of a heating and hot-water supply apparatus 1 according to one embodiment showing its structure.

FIG. 1 is a schematic view of a heating and hot-water supply apparatus 1 according to the present embodiment showing its structure. As shown in the figure, the heating and hot-water supply apparatus 1 includes a housing 2 containing a combustion unit 4 that includes a built-in burner 3 burning mixture gas of fuel gas and combustion air. The combustion unit 4 is connected to a combustion fan 5, which feeds the mixture gas.

The inlet of the combustion fan 5 is adjacent to a joint 6 at which an air supply channel 7 supplying combustion air meets a gas supply channel 8 supplying fuel gas. The gas supply channel 8 includes an open-close valve (not shown) for opening and closing the gas supply channel 8, and a zero governor 9 for lowering the pressure of fuel gas fed from upstream under pressure to the atmospheric pressure. The joint 6 contains a switching valve, which can adjust the ratio of combustion air and fuel gas to flow into the combustion fan 5. When the combustion fan 5 is driven, the air in the housing 2 and the fuel gas downstream from the zero governor 9 in the gas supply channel 8 are drawn into the combustion fan 5 through the joint 6 at a predetermined ratio, and the resultant mixture gas is then fed to the combustion unit 4.

In the combustion unit 4, the built-in burner 3 burns the mixture gas. In the illustrated example, the burner 3 ejects the mixture gas downward, generating downward flames and feeding the combustion exhaust gas downward. The combustion fan 5 is electrically connected to a controller 40 controlling the entire heating and hot-water supply apparatus 1. The controller 40 controls the amount of heat generated at the burner 3 by changing the rotational speed of the combustion fan 5 in accordance with the amount of heat to be used. The burner 3 in the present embodiment corresponds to a heater in an aspect of the present invention. The controller 40 in the present embodiment corresponds to a heating controller in an aspect of the present invention.

The combustion unit 4 includes a spark plug 11 sparking by a high-voltage discharge, a flame rod 12 sensing the flames of the burner 3, and a check valve 13 preventing a backflow from the combustion unit 4 to the combustion fan 5. The spark plug 11 and the flame rod 12 are electrically connected to the controller 40.

A first heat exchanger 15 is below the burner 3, and a second heat exchanger 16 is below the first heat exchanger 15. The combustion exhaust gas generated through combustion by the burner 3 is fed downward through the first heat exchanger 15 and the second heat exchanger 16. The first heat exchanger 15 collects sensible heat from the combustion exhaust gas, and the second heat exchanger 16 collects latent heat from the combustion exhaust gas.

The combustion exhaust gas that has passed through the first heat exchanger 15 and the second heat exchanger 16 then travels along an exhaust duct 17, and is discharged through an exhaust port 18 protruding from the top of the housing 2. In the illustrated example, the housing 2 has an air supply port 19 on its top. The air supply port 19 takes air in the housing 2, and the air is drawn into the combustion fan 5 through the air supply channel 7.

The upstream end of the first heat exchanger 15 is connected to the downstream end of the second heat exchanger 16. The downstream end of the first heat exchanger 15 is connected to the upstream end of a heating terminal (described later) via a supply channel 21. The upstream end of the second heat exchanger 16 is connected to the downstream end of the heating terminal via a return channel 22. The return channel 22 includes a circulating pump 23 feeding a heating medium such as warm water to the second heat exchanger 16, and a return temperature sensor 24 sensing the temperature of the heating medium flowing into the second heat exchanger 16 (hereafter, the return temperature). The circulating pump 23 and the return temperature sensor 24 are electrically connected to the controller 40.

As described above, the second heat exchanger 16 collects the latent heat from the combustion exhaust gas generated by the burner 3. The heating medium fed to the second heat exchanger 16 by the operating circulating pump 23 is preheated with the collected heat and then fed to the first heat exchanger 15. The first heat exchanger 15 heats the heating medium through sensible heat exchange with the combustion exhaust gas generated by the burner 3. The resultant high-temperature heating medium is supplied to the heating terminal through the supply channel 21. The supply channel 21 includes a supply temperature sensor 25 sensing the temperature of the heating medium flowing out of the first heat exchanger 15 (hereafter, the supply temperature). The supply temperature sensor 25 is electrically connected to the controller 40.

The heating medium cooled through the heating terminal returns to the circulating pump 23 through the return channel 22, and is fed to the second heat exchanger 16 again. The heating medium circulated through the heating terminal may be other than warm water and may be silicone oil or another medium.

The supply channel 21 has a branch channel 26 dividing downstream from the supply temperature sensor 25 and connecting to the return channel 22 upstream from the circulating pump 23. The branch channel 26 includes a hot-water supply heat exchanger 27. A three-way valve 28 is provided at the connection point between the branch channel 26 and the return channel 22. The structure of the three-way valve 28 will be described later with reference to another drawing. The three-way valve 28 can change the distribution ratio at which the heating medium flowing out of the first heat exchanger 15 is distributed between the route through the heating terminal and the route through the hot-water supply heat exchanger 27. The three-way valve 28 is electrically connected to the controller 40. The three-way valve 28 in the present embodiment corresponds to a distribution unit in an aspect of the present invention. The controller 40 in the present embodiment corresponds to a switching controller in an aspect of the present invention.

The hot-water supply heat exchanger 27 is a liquid-liquid heat exchanger, to which a water supply channel 30 and a hot-water channel 31 are connected. The water supply channel 30 allows service water to flow to the hot-water supply heat exchanger 27, at which the service water is heated through heat exchange with the heating medium, and the resultant hot water flows out into the hot-water channel 31. The water supply channel 30 includes a water flow sensor 32 for measuring the flow rate of the service water flowing into the heating and hot-water supply apparatus 1, a water flow servo 33 for adjusting the flow rate of the service water, and a supply water temperature sensor 34 for sensing the service water temperature. The hot-water channel 31 includes a heat exchanger exit temperature sensor 35 for sensing the temperature of the hot water immediately after flowing out of the hot-water supply heat exchanger 27. The water flow sensor 32, the water flow servo 33, the supply water temperature sensor 34, and the heat exchanger exit temperature sensor 35 are electrically connected to the controller 40.

The heating and hot-water supply apparatus 1 according to the present embodiment includes a bypass channel 36 that connects the water supply channel 30 and the hot-water channel 31. After flowing into the heating and hot-water supply apparatus 1, the service water in the water supply channel 30 can partly pass through the bypass channel 36 rather than being entirely fed to the hot-water supply heat exchanger 27. The remaining service water is supplied to the hot-water supply heat exchanger 27. The hot water heated with the hot-water supply heat exchanger 27 mixes with the service water passing through the bypass channel 36, and then flows out of the heating and hot-water supply apparatus 1. The bypass channel 36 and the hot-water channel 31 include a bypass servo 37 at their connection. The bypass servo 37 can change the mixing ratio of the hot water heated with the hot-water supply heat exchanger 27 and the service water passing through the bypass channel 36. The bypass servo 37 is electrically connected to the controller 40. The bypass servo 37 in the present embodiment corresponds to an adjuster in an aspect of the present invention.

The hot-water channel 31 includes a hot-water temperature sensor 38 downstream from the bypass servo 37 for sensing the temperature of the hot water flowing out of the heating and hot-water supply apparatus 1. With the service water in the water supply channel 30 partly passing through the bypass channel 36 as described above, the sensed temperature at the hot-water temperature sensor 38 is lower than the sensed temperature at the heat exchanger exit temperature sensor 35. The bypass servo 37 can thus adjust the mixing ratio to stabilize the temperature of the hot water flowing out of the heating and hot-water supply apparatus 1.

The controller 40 is also connected to a hot-water supply remote control 41 and a heating remote control 42. The user can operate the hot-water supply remote control 41 to switch between the enabled (ON) state and the disabled (OFF) state of the hot-water supply operation or set a hot-water supply temperature. The user can also operate the heating remote control 42 to provide an instruction to start or stop the heating operation or set the warming temperature.

Figure 2A:
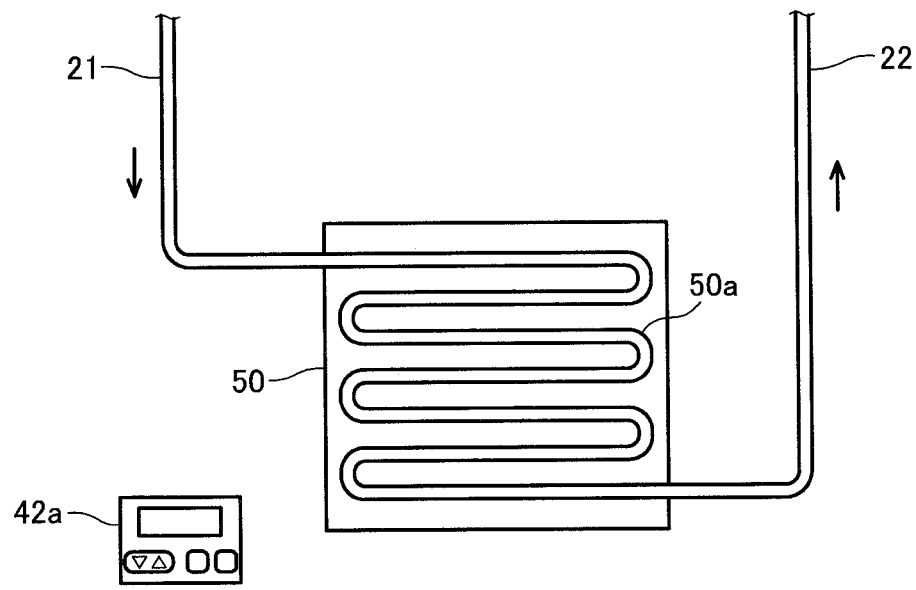
FIGS. 2A and 2B are schematic views of heating terminals according to the embodiment illustrating their structures.
Figure 2B:
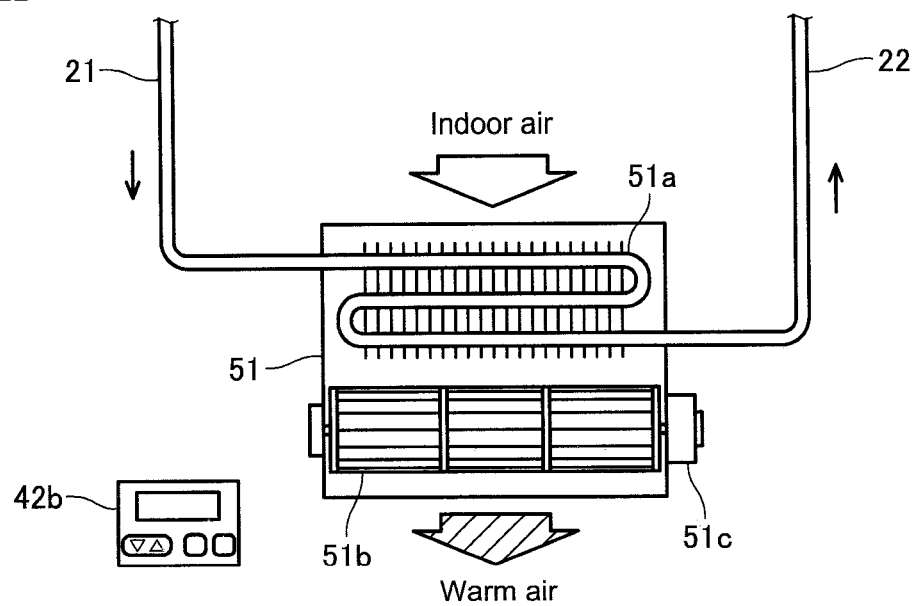

FIGS. 2A and 2B are schematic views of heating terminals according to the present embodiment illustrating their structures. FIG. 2A shows an example structure with a floor heater 50 connected as a heating terminal. The floor heater 50 includes a serpentine pipe 50a, through which the heating medium flows while radiating heat to warm the surroundings. The user can operate a floor heater remote control 42a to provide an instruction to activate or stop the floor heater 50 or set the warming temperature of the floor heater 50. The floor heater 50 in the present embodiment corresponds to a radiator (radiant heating terminal) in an aspect of the present invention.

FIG. 2B shows an example structure with a fan convector (room heater) 51 connected as a heating terminal. The fan convector 51 includes a heating heat exchanger 51a and an air-blowing fan 51b. The air-blowing fan 51b shown in the figure is a crossflow fan. When the heating medium is circulated through the heating heat exchanger 51a and the air-blowing fan 51b is rotated by driving of a fan motor 51c, indoor air is drawn into the fan convector 51 and heated through heat exchange with the heating medium when passing through the heating heat exchanger 51a. The resultant warm air is blown out. The user can operate a fan convector remote control 42b to provide an instruction to activate or stop the fan convector 51 or set the warming temperature of the fan convector 51. The fan convector 51 in the present embodiment corresponds to a convector (convectional heating terminal) in an aspect of the present invention.

Figure 3A:
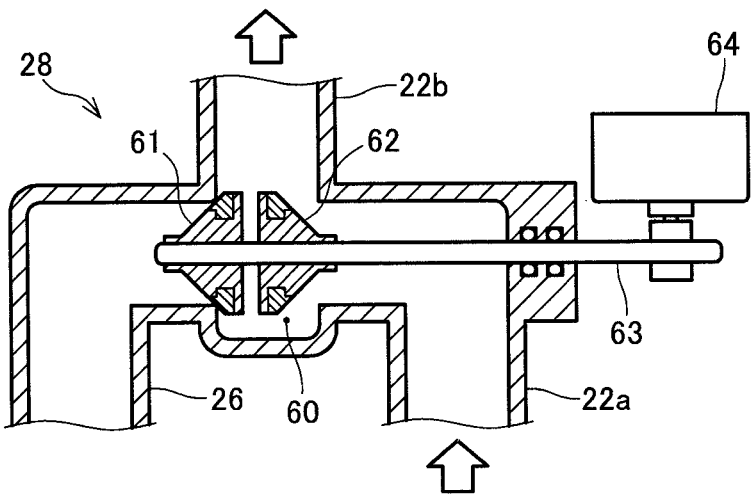
FIGS. 3A, 3B, and 3C are cross-sectional views of a three-way valve 28 showing its structure.
Figure 3B:
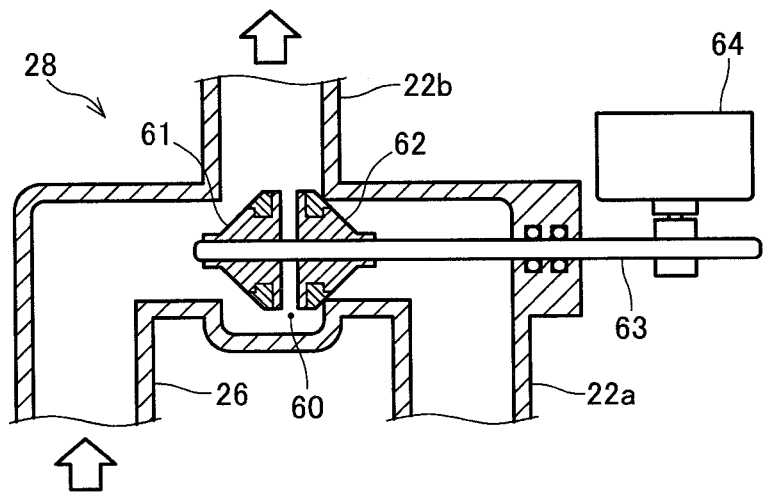
Figure 3C:
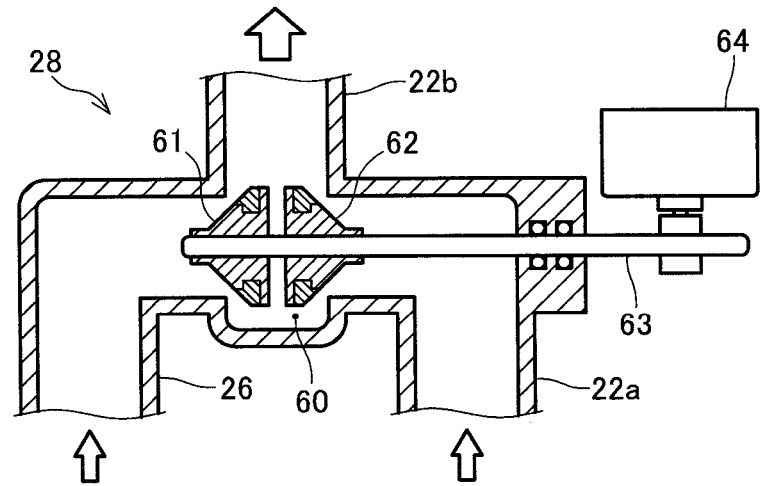

FIGS. 3A to 3C are cross-sectional views of the three-way valve 28. As shown in the figures, the three-way valve 28 includes an inner valve chamber 60 open in three directions. In the illustrated example, the left opening of the valve chamber 60 connects to the branch channel 26, the right opening and the upper opening connect to the return channel 22. The right opening connects to the section of the return channel 22 continuous with the heating terminal (hereafter, the terminal-connected return channel 22a), and the upper opening connects to the section of the return channel 22 continuous with the circulating pump 23 (hereafter, the pump-connected return channel 22b).

The valve chamber 60 contains a hot-water supply channel valve element 61 opening and closing the branch channel 26 and a heating channel valve element 62 opening and closing the terminal-connected return channel 22a. The hot-water supply channel valve element 61 and the heating channel valve element 62 are arranged opposite to each other and attached to a movable shaft 63 that can reciprocate horizontally. The movable shaft 63 is driven by a drive motor 64. The drive motor 64 in the present embodiment is a stepper motor.

FIG. 3A shows the valve in which the movable shaft 63 has moved to the left with the hot-water supply channel valve element 61 closing the branch channel 26 and the heating channel valve element 62 opening the terminal-connected return channel 22a. In this state, the heating medium forced out of the first heat exchanger 15 by the circulating pump 23 circulates through the heating terminal (the floor heater 50 or the fan convector 51) without being distributed to the hot-water supply heat exchanger 27. This is the heating operation.

When the drive motor 64 drives the movable shaft 63 to move to the right, as shown in FIG. 3B, the heating channel valve element 62 closes the terminal-connected return channel 22a, and the hot-water supply channel valve element 61 opens the branch channel 26. In this state, the heating medium forced out of the first heat exchanger 15 by the circulating pump 23 circulates through the hot-water supply heat exchanger 27 without being distributed to the heating terminal. This is the hot-water supply operation.

As shown in FIG. 3C, when the movable shaft 63 is stopped in the middle state between the state for the heating operation in FIG. 3A and the state for the hot-water supply operation in FIG. 3B, both the branch channel 26 and the terminal-connected return channel 22a are open. In this state, the heating medium forced out of the first heat exchanger 15 by the circulating pump 23 is distributed to both the heating terminal (the floor heater 50 or the fan convector 51) and the hot-water supply heat exchanger 27 while circulating. This allows the simultaneous operation of simultaneously performing the heating operation and the hot-water supply operation.

In this manner, the heating and hot-water supply apparatus 1 may switch between the heating operation and the hot-water supply operation by using the common heating medium, and also allow the simultaneous operation. In the simultaneous operation, the heating operation and the hot-water supply operation may compete for heat generated by the burner 3. In a known heating and hot-water supply apparatus, the hot-water supply operation is typically prioritized over the heating operation. A heating and hot-water supply apparatus may determine whether the simultaneous operation can be performed based on the amount of heat to be used for the hot-water supply operation. When a large amount of heat is to be used for the hot-water supply operation, the apparatus does not allow the simultaneous operation and focuses on the hot-water supply operation. However, when the hot-water supply operation is requested during the heating operation, not allowing the simultaneous operation and focusing on the hot-water supply operation may degrade the user comfort for heating.

For example, when the heating medium is suspended to circulate through a heating terminal that radiates heat with blowing air (thereafter, a convectional heating terminal), such as the fan convector 51 described above, no warm air fed from the fan convector 51 may cause the user to feel cold, thus degrading the comfort. Thus, convectional heating terminals are inappropriate for the procedure of suspending the heating operation (or performing the hot-water supply operation with higher priority) in response to a request for the hot-water supply operation during the heating operation. The fan convector 51 in the present embodiment corresponds to an unsuspendible terminal in an aspect of the present invention.

In contrast, a heating terminal that radiates heat without blowing air (thereafter, a radiant heating terminal), such as the floor heater 50 described above, is surrounded by the heat stored in the floor or another area near the pipe 50a, and thus does not easily cool in the pipe 50a although the heating medium circulation is suspended temporarily. Thus, the apparatus suspends the heating operation (or performs the hot-water supply operation with higher priority) in response to a request for the hot-water supply operation during the heating operation, without greatly affecting the room temperature and the user comfort. The floor heater 50 in the present embodiment corresponds to a suspendible terminal in an aspect of the present invention.

When the heating and hot-water supply apparatus 1 according to the present embodiment receives a request for the hot-water supply operation during the heating operation, the controller 40 performs a mid-heating procedure below to respond to the request for the hot-water supply operation without degrading the user comfort for heating.

Figure 4:
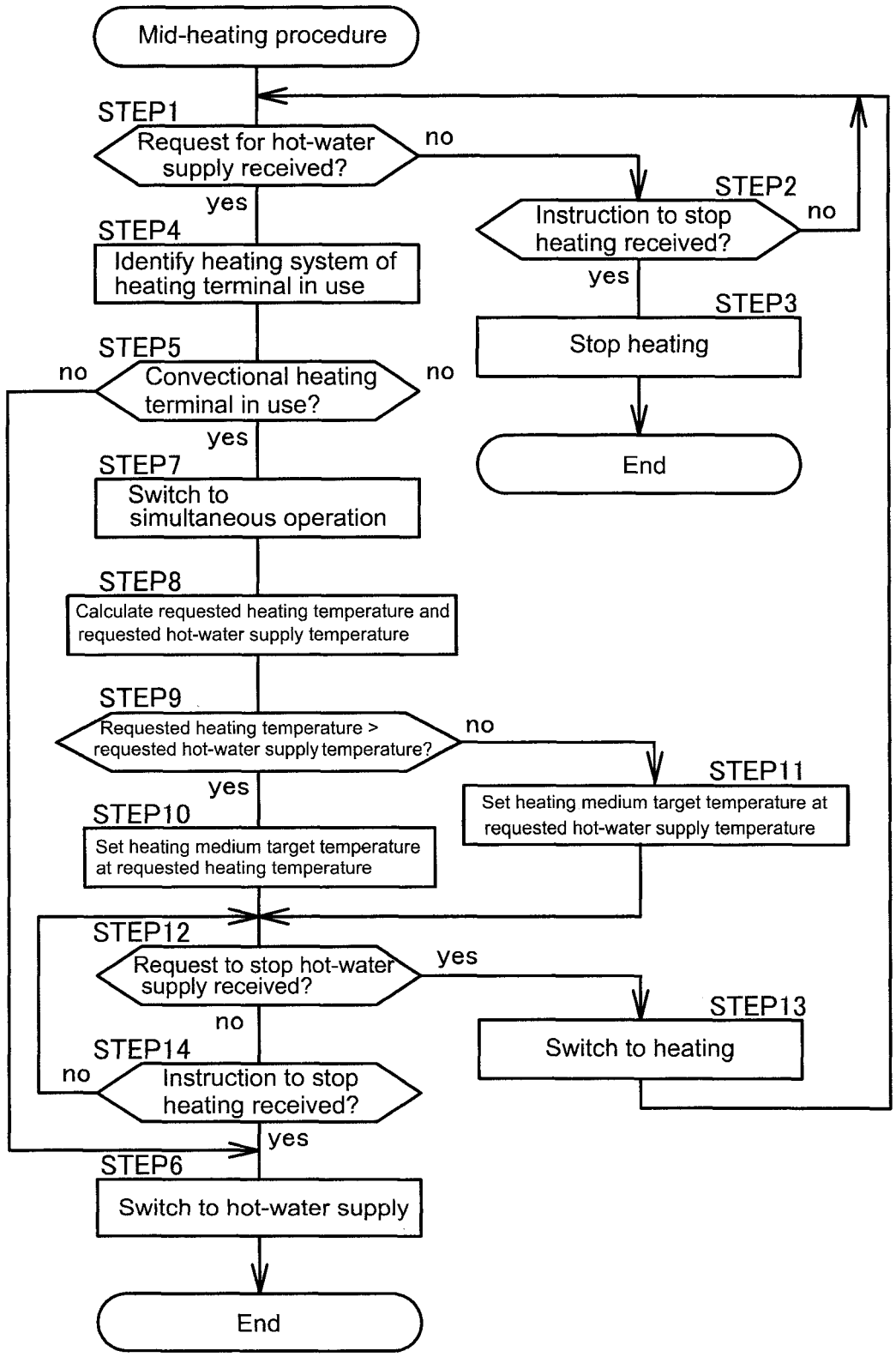
FIG. 4 is a flowchart of a mid-heating procedure performed by a controller 40 according to the embodiment.

FIG. 4 is a flowchart of the mid-heating procedure performed by the controller 40 according to the present embodiment. The mid-heating procedure is performed after the user operates the heating remote control 42 to start the heating operation (the operation of the floor heater 50 or the fan convector 51). When the heating operation is started, the circulating pump 23 is operated with the three-way valve 28 in the state for the heating operation in FIG. 3A, and causes the burner 3 to start burning the mixture gas. The amount of heat generated by the burner 3 is controlled in accordance with the heating operation.

When the mid-heating procedure starts, the determination is performed as to whether a request for the hot-water supply operation is received (Step 1). With the hot-water supply operation enabled (ON) by an operation of the hot-water supply remote control 41, the user may turn on a hot-water tap (not shown), and then the flow rate of the service water measured at the water flow sensor 32 may become a predetermined rate or higher. In this case, the controller 40 in the present embodiment determines that a request for the hot-water supply operation is received (Step 1: Yes).

Without a request for the hot-water supply operation (Step 1: No), the determination is performed as to whether an instruction to stop the heating operation is received (Step 2). With an instruction to stop the heating operation from the user operating the heating remote control 42 (Step 2: Yes), the heating operation is stopped (Step 3), and the mid-heating procedure in FIG. 4 ends. In Step 3, the combustion at the burner 3 is stopped, and then the circulating pump 23 is stopped. Subsequently, in response to an instruction to start the heating operation from the user operating the heating remote control 42, the heating operation is restarted. The mid-heating procedure in FIG. 4 is then performed again.

In contrast, without an instruction to stop the heating operation (Step 2: No), the processing returns to Step 1 to repeat the determination as to whether a request for the hot-water supply operation is received (Step 1) and the determination as to whether an instruction to stop the heating operation is received (Step 2). When a request for the hot-water supply operation is received (Step 1: Yes), the type of the heating terminal (heating system) in use is identified (Step 4).

As shown in FIG. 2, the heating and hot-water supply apparatus 1 in the present embodiment is connected to the radiant floor heater 50 or the fan convector 51 as a heating terminal. The floor heater remote control 42a or the fan convector remote control 42b transmits information about the type of the corresponding heating terminal (the floor heater 50 or the fan convector 51) to the controller 40. The controller 40 can identify the heating system of the heating terminal based on the received information. The installer or the maintenance operator for the heating and hot-water supply apparatus 1 may input the type of the heating terminal into the controller 40. The controller 40 in the present embodiment corresponds to a determination unit in an aspect of the present invention.

After the heating system of the heating terminal is identified, the determination is performed as to whether the convectional heating terminal (the fan convector 51) is in use (Step 5). When the radiant heating terminal (the floor heater 50) is in use (Step 5: No), it is allowable to suspend the heating medium circulation through the radiant heating terminal. So, the operation switches to the hot-water supply operation (Step 6), and the mid-heating procedure in FIG. 4 ends. In Step 6, the three-way valve 28 is switched from the state for the heating operation in FIG. 3A to the state for the hot-water supply operation in FIG. 3B to suspend the heating medium circulation through the heating terminal (the floor heater 50), leading all the heating medium to the hot-water supply heat exchanger 27. The amount of heat (rate of combustion) generated by the burner 3 is controlled in accordance with the hot-water supply operation. Subsequently, in response to a request to stop the hot-water supply operation, the heating operation is resumed from the hot-water supply operation to perform the mid-heating procedure in FIG. 4.

In contrast, with the convectional heating terminal (the fan convector 51) determined to be in use in Step 5 (Step 5: Yes), it is not allowable to suspend the heating medium circulation through the convectional heating terminal. The operation switches to the simultaneous operation (Step 7). In Step 7, the three-way valve 28 is switched from the state for the heating operation in FIG. 3A to the middle state in FIG. 3C, causing the heating medium to circulate through both the heating terminal (the fan convector 51) and the hot-water supply heat exchanger 27.

Subsequently, the supply temperature of the heating medium is calculated as requested for the heating operation (hereafter, the requested heating temperature), and also the supply temperature of the heating medium is calculated as requested for the hot-water supply operation (hereafter, the requested hot-water supply temperature) (Step 8). The requested heating temperature in the fan convector 51 is determined in accordance with the temperature set on the fan convector remote control 42b (thereafter, the set temperature). The requested heating temperature increases as the set temperature of the fan convector 51 increases. The requested hot-water supply temperature is determined in accordance with the flow rate of the service water measured at the water flow sensor 32, the service water temperature sensed at the supply water temperature sensor 34, and the set temperature for the hot-water supply that is set on the hot-water supply remote control 41. The requested hot-water supply temperature increases as the flow rate of the service water increases, the service water temperature decreases, or the set temperature for the hot-water supply increases.

The determination is then performed as to whether the calculated requested heating temperature is higher than the requested hot-water supply temperature (Step 9). When the requested heating temperature is higher than the requested hot-water supply temperature (Step 9: Yes), the target temperature of the supply temperature (the temperature of the heating medium flowing out of the first heat exchanger 15) is set at the requested heating temperature to control the amount of heat generated by the burner 3 (Step 10). The heating medium heated to the requested heating temperature through the first heat exchanger 15 is fed to the fan convector 51, preventing a decrease (or insufficiency) in the heating capacity of the fan convector 51 during the simultaneous operation. The hot-water supply heat exchanger 27 is fed with the heating medium with a temperature higher than the requested hot-water supply temperature. However, the service water in the water supply channel 30 can partly pass through the bypass channel 36 rather than being entirely fed to the hot-water supply heat exchanger 27. Thus, the bypass servo 37 can be used to adjust the mixing ratio of the hot water heated with the hot-water supply heat exchanger 27 and the service water passing through the bypass channel 36, allowing hot-water supply to be set at a temperature intended by the user.

In contrast, when the requested heating temperature is equal to or lower than the requested hot-water supply temperature (Step 9: No), the target temperature of the supply temperature is set at the requested hot-water supply temperature to control the amount of heat generated by the burner 3 (Step 11). The heating medium heated to the requested hot-water supply temperature through the first heat exchanger 15 is fed to the hot-water supply heat exchanger 27, preventing a decrease (or insufficiency) in the hot-water supply capacity during the simultaneous operation. In addition, the flow rate of the heating medium fed to the fan convector 51 can be decreased with the three-way valve 28 to prevent the fan convector 51 from overheating.

After the target temperature of the supply temperature is set for the simultaneous operation, the determination is performed as to whether a request to stop the hot-water supply operation is received (Step 12). When the user turns off the hot-water tap (not shown) and the flow rate of the service water measured at the water flow sensor 32 becomes lower than a predetermined rate, the controller 40 in the present embodiment determines that a request to stop the hot-water supply operation is received. When a request to stop the hot-water supply operation is received (Step 12: Yes), the operation switches from the simultaneous operation to the heating operation (Step 13). In Step 13, the three-way valve 28 is switched from the middle state in FIG. 3C to the state for the heating operation in FIG. 3A to resume the heating operation. The mid-heating procedure then returns to the start, repeating Step 1 and the subsequent steps described above.

In contrast, without a request to stop the hot-water supply operation (Step 12: No), the determination is then performed as to whether an instruction to stop the heating operation (the fan convector 51) is received during the simultaneous operation (Step 14). Without an instruction to stop the heating operation (Step 14: No), the processing returns to Step 12 to repeat the determination as to whether a request to stop the hot-water supply operation is received (Step 12) and the determination as to whether an instruction to stop the heating operation is received (Step 14).

When an instruction to stop the heating operation is received from the user operating the fan convector remote control 42b during the simultaneous operation (Step 14: Yes), the three-way valve 28 is switched from the middle state in FIG. 3C to the state for the hot-water supply operation in FIG. 3B to stop the heating medium circulation through the heating terminal (the fan convector 51) and switch to the hot-water supply operation (Step 6). The mid-heating procedure in FIG. 4 then ends.

When an instruction to start the heating operation (the floor heater 50 or the fan convector 51) is received during the hot-water supply operation, the heating and hot-water supply apparatus 1 according to the present embodiment does not allow the simultaneous operation and continues the hot-water supply operation. This is because switching from the hot-water supply operation to the simultaneous operation causes the heat generated by the burner 3 to be distributed to the heating operation. The resultant temporary decrease (or insufficiency) in the heat for the hot-water supply operation may greatly vary the temperature of the hot water flowing out of the heating and hot-water supply apparatus 1. This can delay the start of the heating operation until the hot-water supply operation stops. However, such delay does not greatly degrade the user comfort, because no warm air has been blown when the heating operation (the fan convector 51) is started.

As described above, when receiving a request for the hot-water supply operation during the heating operation, the heating and hot-water supply apparatus 1 according to the present embodiment may determine whether the simultaneous operation can be performed based on the type of the heating terminal in use. For the radiant floor heater 50, the heating medium is surrounded by nearby stored heat around the pipe 50a, and thus does not cool easily in the pipe 50a or does not greatly affect the room temperature although the circulation is suspended temporarily. The heating operation can thus be suspended, and the hot-water supply operation can be performed with higher priority. Thus, the heating and hot-water supply apparatus 1 does not allow the simultaneous operation and performs the hot-water supply operation. The heat generated by the burner 3 focuses on the hot-water supply operation, thus maximizing the hot-water supply capacity. In contrast, for the fan convector 51, no warm air is fed from the fan convector 51 when the heating medium circulation is suspended. Thus, the heating and hot-water supply apparatus 1 can switch to the simultaneous operation with the heating operation maintained, thus responding to the request for the hot-water supply operation while preventing the user comfort for heating from being degraded (the user from feeling cold).

The heating and hot-water supply apparatus 1 according to the present embodiment may also compare the requested heating temperature (the supply temperature of the heating medium required for the heating operation) with the requested hot-water supply temperature (the supply temperature of the heating medium required for the hot-water supply operation) in the simultaneous operation. With the requested heating temperature higher than the requested hot-water supply temperature, the heating and hot-water supply apparatus 1 sets the target temperature of the supply temperature in the simultaneous operation at the requested heating temperature to control the amount of heat generated by the burner 3. The heating medium heated to the requested heating temperature is fed to the fan convector 51, preventing a decrease (or insufficiency) of the amount of heat for the fan convector 51 during the simultaneous operation. Additionally, the hot-water supply operation during the simultaneous operation allows the bypass servo 37 to change the mixing ratio of the hot water heated with the hot-water supply heat exchanger 27 and the service water passing through the bypass channel 36. Thus, although the hot-water supply heat exchanger 27 receives a heating medium with a temperature higher than the requested hot-water supply temperature, the mixing ratio can be adjusted to supply hot water at the set temperature intended by the user.

The heating and hot-water supply apparatus 1 in the present embodiment may be modified as described below. Differences of the modification from the above embodiment will be described mainly. The same components in the modification as in the above embodiment will not be described in detail.

Figure 5:
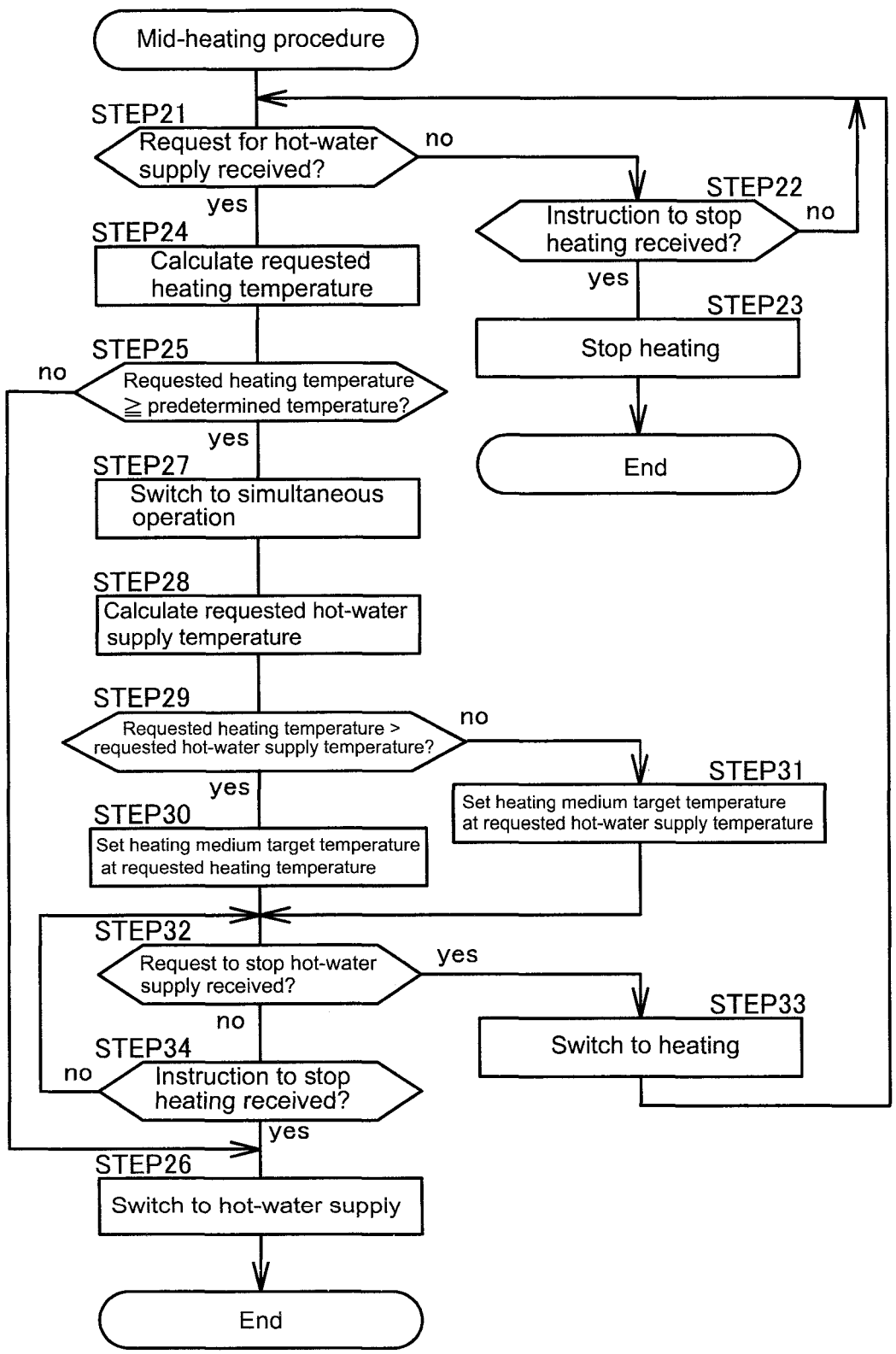
FIG. 5 is a flowchart of a mid-heating procedure according to a modification.

FIG. 5 is a flowchart of a mid-heating procedure according to the modification. When the mid-heating procedure according to the modification is started, the determination is performed as to whether a request for the hot-water supply operation is received (Step 21). Without a request for the hot-water supply operation (Step 21: No), the determination is performed as to whether an instruction to stop the heating operation is received (Step 22). When an instruction to stop the heating operation is received (Step 22: Yes), the heating operation is stopped (Step 23), and the mid-heating procedure in FIG. 5 ends.

In contrast, without an instruction to stop the heating operation (Step 22: No), the processing returns to Step 21 to repeat the determination as to whether a request for the hot-water supply operation is received (Step 21) and the determination as to whether an instruction to stop the heating operation is received (Step 22). When a request for the hot-water supply operation is received (Step 21: Yes), the requested heating temperature (the supply temperature of the heating medium required for the heating operation) is calculated (Step 24), and the determination is performed as to whether the requested heating temperature is higher than a predetermined temperature (e.g., 60° C.) (Step 25).

The requested heating temperature is determined in accordance with the set temperature for heating that is set on the heating remote control 42. In the same manner as in the above embodiment, the heating and hot-water supply apparatus 1 in the modification is also connected to the radiant floor heater 50 or the fan convector 51 as a heating terminal. A convectional heating terminal (fan convector 51) typically has a requested heating temperature higher than a radiant heating terminal (floor heater 50). The type of the heating terminal can thus be determined based on the requested heating temperature. When the requested heating temperature is a low temperature lower than the predetermined temperature (Step 25: No), the heating terminal in use is determined as the radiant floor heater 50. Thus, the simultaneous operation is not allowed, and the three-way valve 28 is switched to the hot-water supply operation (Step 26). The mid-heating procedure in FIG. 5 then ends.

In contrast, when the requested heating temperature is determined to be a high temperature equal to or higher than the predetermined temperature through the determination in Step 25 (Step 25: Yes), the heating terminal in use is determined as the fan convector 51. Thus, the simultaneous operation is allowed, and the three-way valve 28 is switched to the simultaneous operation (Step 27). Subsequently, the requested hot-water supply temperature (the supply temperature of the heating medium required for the hot-water supply operation) is calculated (Step 28), and the determination is performed as to whether the requested heating temperature calculated in Step 24 is higher than the requested hot-water supply temperature (Step 29). The requested hot-water supply temperature is determined in accordance with the flow rate of the service water measured at the water flow sensor 32, the service water temperature sensed at the supply water temperature sensor 34, and the set temperature for the hot-water supply that is set on the hot-water supply remote control 41.

When the requested heating temperature is higher than the requested hot-water supply temperature (Step 29: Yes), the target temperature of the supply temperature is set at the requested heating temperature (Step 30). When the requested heating temperature is equal to or lower than the requested hot-water supply temperature (Step 29: No), the target temperature of the supply temperature is set at the requested hot-water supply temperature (Step 31). After the target temperature of the supply temperature in the simultaneous operation is set, the determination is performed as to whether a request to stop the hot-water supply operation is received (Step 32). When a request to stop the hot-water supply operation is received (Step 32: Yes), the three-way valve 28 is switched from the simultaneous operation to the heating operation (Step 33). The mid-heating procedure then returns to the start, repeating Step 21 and the subsequent steps described above.

In contrast, without a request to stop hot-water supply operation (Step 32: No), the determination is then performed as to whether an instruction to stop the heating operation is received during the simultaneous operation (Step 34). Without an instruction to stop the heating operation (Step 34: No), the processing returns to Step 32 to repeat the determination as to whether a request to stop the hot-water supply operation is received (Step 32) and the determination as to whether an instruction to stop the heating operation is received (Step 34). With an instruction to stop the heating operation received during the simultaneous operation (Step 34: Yes), the three-way valve 28 is switched to the hot-water supply operation (Step 26). The mid-heating procedure in FIG. 5 then ends.

As described above, when receiving a request for the hot-water supply operation during the heating operation, the heating and hot-water supply apparatus 1 according to the modification may determine whether the simultaneous operation can be performed by determining the heating system of the heating terminal based on the requested heating temperature. A convectional heating terminal typically has a requested heating temperature higher than a radiant heating terminal. Thus, for a high requested heating temperature equal to or higher than a predetermined temperature, the heating terminal can be determined to be convectional. For a low requested heating temperature lower than the predetermined temperature, the heating terminal can be determined to be radiant. Determining the heating system of the heating terminal based on the requested heating temperature in this manner enables the determination as to whether the simultaneous operation can be performed without communication about the heating system from the heating terminal to the controller 40 or without information about the heating system of the heating terminal input into the controller 40 by the installer for the heating and hot-water supply apparatus 1.

Although the heating and hot-water supply apparatuses 1 according to the embodiment and the modification have been described, the embodiment and the modification disclosed herein should not be construed to be restrictive, but may be modified variously without departing from the scope and the spirit of the invention.

For example, in the above embodiment, the determination as to whether the simultaneous operation can be performed is based on the heating system (radiant or convectional) of the heating terminal. However, the user may preset the heating terminal as a suspendible terminal, which suspends the heating operation in response to a request for the hot-water supply operation during the heating operation, or an unsuspendible terminal, which does not suspend the heating operation in response to a request for the hot-water supply operation during the heating operation. For example, a heating terminal installed in a nursery or a thermostatic chamber may be set as an unsuspendible terminal. In response to a request for the hot-water supply operation during the heating operation, a suspendible heating terminal in use may switch to the hot-water supply operation by not allowing the simultaneous operation, or an unsuspendible terminal may switch to the simultaneous operation.

Figure 6:
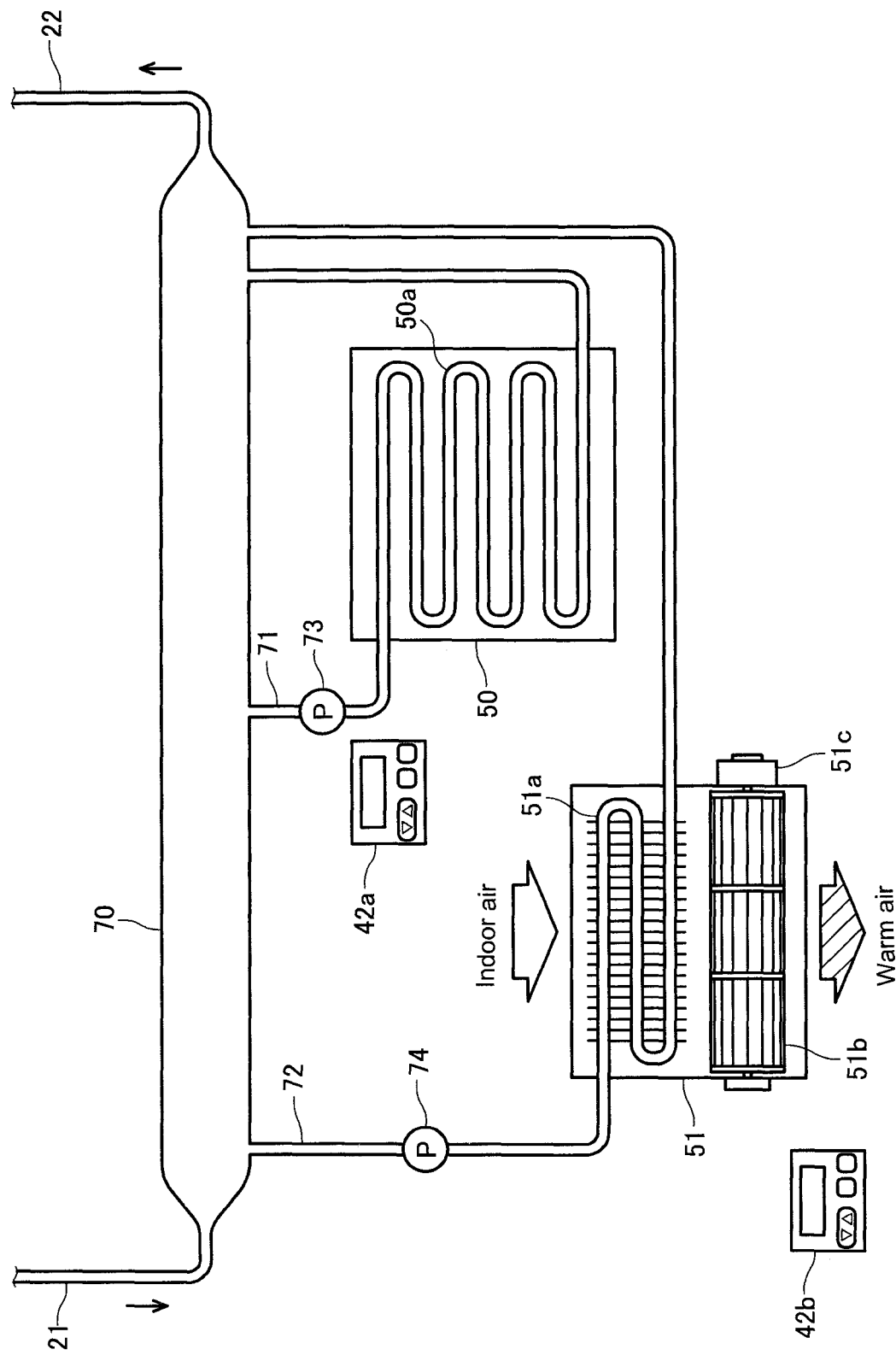
FIG. 6 is a schematic view of an example structure with both a radiant floor heater 50 and a fan convector 51 connected.

In the above embodiment and modification, the radiant floor heater 50 or the fan convector 51 is connected as a heating terminal. However, both the floor heater 50 and the fan convector 51 may be connected as shown in FIG. 6. In the illustrated example, the supply channel 21 from the first heat exchanger 15 is connected to the upstream end of a reservoir 70 temporarily storing the heating medium, and the return channel 22 is connected to the downstream end of the reservoir 70. When the three-way valve 28 is switched to the state for the heating operation in FIG. 3A, the heating medium circulates while passing through the reservoir 70. The reservoir 70 has a first drawing channel 71 connecting to the downstream end of the reservoir 70 and to a midstream point of the reservoir 70, and also a second drawing channel 72 connecting to the upstream end of the reservoir 70 and to the downstream end of the reservoir 70. The first drawing channel 71 has the floor heater 50 installed and a first pump 73 for drawing the heating medium from the reservoir 70 into the first drawing channel 71. The second drawing channel 72 has the fan convector 51 installed and a second pump 74 for drawing the heating medium from the reservoir 70 into the second drawing channel 72. Activating the first pump 73 allows the heating medium to circulate through the floor heater 50. Activating the second pump 74 allows the heating medium to circulate through the fan convector 51. Additionally, activating both the first pump 73 and the second pump 74 allows the heating medium to circulate through both the floor heater 50 and the fan convector 51. The first pump 73 and the second pump 74 are electrically connected to the controller 40.

The heating and hot-water supply apparatus 1 with both the radiant floor heater 50 and the fan convector 51 connected may receive a request for the hot-water supply operation during the heating operation of the floor heater 50 or the fan convector 51. In this case, the heating and hot-water supply apparatus 1 follows the same process as described in the above embodiment and modification. In some cases, the heating and hot-water supply apparatus 1 may receive a request for the hot-water supply operation during the heating operation of both the floor heater 50 and the fan convector 51. In response to this request, the heating and hot-water supply apparatus 1 switches to the simultaneous operation in the same manner as with the fan convector 51. More specifically, when both the floor heater 50 and the fan convector 51 are determined to be in use in Step 4 of the mid-heating procedure in the embodiment (FIG. 4), the fan convector 51 is determined to be in use in Step 5 (Step 5: Yes), and then the three-way valve 28 is switched to the simultaneous operation (Step 7). During the simultaneous operation, the floor heater 50 may be out of operation by stopping the first pump 73.

During the heating operation of both the floor heater 50 and the fan convector 51, the requested heating temperature (the supply temperature of the heating medium required for the heating operation) may be set at a temperature for the fan convector 51, which has the higher temperature. For the floor heater 50, which has the lower temperature, the first pump 73 may be controlled to decrease the flow rate of the heating medium fed to the floor heater 50 or intermittently feed the heating medium to the floor heater 50, preventing the floor heater 50 from overheating. In the mid-heating procedure (FIG. 5) according to the above modification, the requested heating temperature in the fan convector 51, having the high temperature, is calculated in Step 24, and the calculated requested heating temperature is determined to be equal to or higher than the predetermined temperature in Step 25 (Step 25: Yes). The three-way valve 28 is then switched to the simultaneous operation (Step 27).

REFERENCE SIGNS LIST 1 heating and hot-water supply apparatus
2 housing
3 burner
4 combustion unit
5 combustion fan
6 joint
7 air supply channel
8 gas supply channel
9 zero governor
11 spark plug
12 flame rod
13 check valve
15 first heat exchanger
16 second heat exchanger
17 exhaust duct
18 exhaust port
19 air supply port
21 supply channel
22 return channel
23 circulating pump
24 return temperature sensor
25 supply temperature sensor
26 branch channel
27 hot-water supply heat exchanger
28 three-way valve
30 water supply channel
31 hot-water channel
32 water flow sensor
33 water flow servo
34 supply water temperature sensor
35 heat exchanger exit temperature sensor
36 bypass channel
37 bypass servo
38 hot-water temperature sensor
40 controller
41 hot-water supply remote control
42 heating remote control
50 floor heater
50a pipe
51 fan convector
51a heating heat exchanger
51b air-blowing fan
51c fan motor
60 valve chamber
61 hot-water supply channel valve element
62 heating channel valve element
63 movable shaft
64 drive motor
70 reservoir
71 first drawing channel
72 second drawing channel
73 first pump
74 second pump

The invention claimed is:

1. A heating and hot-water supply apparatus for performing, using a common heating medium, a heating operation by circulating the heating medium through a heating terminal, a hot-water supply operation of heating service water through heat exchange with the heating medium circulated through a hot-water supply heat exchanger and supplying hot water, and a simultaneous operation of simultaneously performing the heating operation and the hot-water supply operation, the apparatus comprising:
  as the heating terminal, a radiator that radiates heat without blowing air or a convector that radiates heat with blowing air;
  a heater configured to heat the heating medium;
  a controller that is electrically connected to and controls the heater and the heating terminal; and
  a valve configured to change a distribution ratio of the heating medium distributed between the heating terminal and the hot-water supply heat exchanger,
  wherein:
  the controller is configured to control the valve to switch between the heating operation, the hot-water supply operation, and the simultaneous operation;
  configured to control an amount of heat generated by the heater to adjust a temperature of the heating medium; and
  configured to determine whether the heating terminal proceeding in the heating operation is a suspendible terminal to suspend the heating operation in response to a request for the hot-water supply operation or an unsuspendible terminal not to suspend the heating operation in response to a request for the hot-water supply operation, wherein in response to a request for the hot-water supply operation during the heating operation, the controller does not allow the simultaneous operation but switches to the hot-water supply operation when the heating terminal proceeding in the heating operation is the suspendible terminal, and switches to the simultaneous operation when the heating terminal proceeding in the heating operation is the unsuspendible terminal, and wherein the controller determines the heating terminal as the suspendible terminal when the heating terminal is the radiator that radiates heat without blowing air, and determines the heating terminal as the unsuspendible terminal when the heating terminal is the convector that radiates heat with blowing air.

2. The heating and hot-water supply apparatus according to claim 1, wherein the controller determines that the heating terminal is the radiator thereby being the suspendible terminal when a requested heating temperature being a temperature of the heating medium required for the heating operation is lower than a predetermined temperature, and determines that the heating terminal is the convector thereby being the unsuspendible terminal when the requested heating temperature is equal to or higher than the predetermined temperature.

3. The heating and hot-water supply apparatus according to claim 1, further comprising:

a water supply channel configured to feed service water to the hot-water supply heat exchanger;

a hot-water channel configured to allow the hot water heated with the hot-water supply heat exchanger to flow;

a bypass channel connecting the water supply channel and the hot-water channel and configured to allow a part of the service water in the water supply channel to bypass the hot-water supply heat exchanger and flow into the hot-water channel; and a bypass servo configured to adjust a ratio of the service water passing through the bypass channel, wherein when a requested heating temperature being a temperature of the heating medium required for the heating operation is higher than a requested hot-water supply temperature being a temperature of the heating medium required for the hot-water supply operation, in response to switching to the simultaneous operation, the controller sets a target temperature of the heating medium in the simultaneous operation at the requested heating temperature.

4. The heating and hot-water supply apparatus according to claim 2, further comprising:

a water supply channel configured to feed service water to the hot-water supply heat exchanger;

a hot-water channel configured to allow the hot water heated with the hot-water supply heat exchanger to flow;

a bypass channel connecting the water supply channel and the hot-water channel and configured to allow a part of the service water in the water supply channel to bypass the hot-water supply heat exchanger and flow into the hot-water channel; and a bypass servo configured to adjust a ratio of the service water passing through the bypass channel, wherein when a requested heating temperature being a temperature of the heating medium required for the heating operation is higher than a requested hot-water supply temperature being a temperature of the heating medium required for the hot-water supply operation, in response to switching to the simultaneous operation, the controller sets a target temperature of the heating medium in the simultaneous operation at the requested heating temperature.

* * * * *